United States Patent [19]

Conatser

[11] Patent Number: 4,766,927
[45] Date of Patent: Aug. 30, 1988

[54] ABRASIVE FLUID CONTROL VALVE WITH PLASTIC SEAT

[75] Inventor: Roger L. Conatser, Antioch, Tenn.

[73] Assignee: Scott & Fetzer Company, Westlake, Ohio

[21] Appl. No.: 8,872

[22] Filed: Jan. 29, 1987

[51] Int. Cl.$^4$ ...................... F16K 43/00; F16K 15/06
[52] U.S. Cl. ................................ 137/315; 137/454.5; 137/541; 137/543.13; 251/333; 251/361; 251/362; 251/365
[58] Field of Search ........... 137/540, 541, 542, 543.13, 137/315, 454.5; 251/333, 360, 361, 362, 363, 364, 365

[56] References Cited

U.S. PATENT DOCUMENTS

| | | | |
|---|---|---|---|
| 620,936 | 3/1899 | Kunzer | 137/542 |
| 753,814 | 3/1904 | Smyser | 137/542 |
| 987,218 | 3/1911 | Cordley | 251/361 |
| 1,029,025 | 6/1912 | Murray | 137/542 |
| 2,063,821 | 12/1936 | McKenzie | 137/542 |
| 2,348,548 | 5/1944 | Koehler | 251/364 |
| 2,410,946 | 11/1946 | Johnson | 137/541 |
| 4,084,609 | 4/1978 | Johnson | 137/542 |
| 4,181,144 | 1/1980 | Landen | 137/541 |

*Primary Examiner*—George L. Walton
*Attorney, Agent, or Firm*—Mark J. Patterson

[57] ABSTRACT

A valve to control abrasive fluids under high pressure has a plastic seat. A circular ridge peripherally formed on the valve cartridge sealingly engages the seat. A means is provided within the valve cartridge to support the seat axially and radially. The diameter and taper of the poppet match those of a mating recess in the seat.

3 Claims, 3 Drawing Sheets

ABRASIVE FLUID CONTROL VALVE WITH PLASTIC SEAT

BACKGROUND OF THE INVENTION

The present invention relates to a valve for use in abrasive fluid handling applications, which employs a plastic valve seat.

Machines and systems which are designed to carry fluids usually incorporate valves of various types to control the flow and pressure of fluids in the system. For example, spring-biased check valves are used to regulate the flow of fluid into a pump thereby maintaining the desired fluid flow, volume, or pressure within the pump. Similar valves are used to control the flow of fluids out of the pump.

The use of abrasive fluids under high pressure poses particular problems for the internal components of the fluid control valves. Latex paint can cause rapid wear of the valve seats in pumps used in airless paint spray systems, and of seats in valves used to control paint flow out of the spray gun. To minimize the resultant wear, tungsten carbide valve seats and poppets have been used. Tungsten carbide is, however, an expensive material. Also, its relative hardness means that the seat must be machined to very close tolerances so that it can be press-fit into the valve cartridge. Otherwise, it must be braised in place using heat. Also, a hard material such as tungsten carbide does not give as tight a seal as do softer materials which can deform to compensate for wear.

Valve seats made of plastic are well known and preferred because of their low cost and resilient sealing properties. In high pressure, abrasive environments such as that presented by an airless paint pump and spray gun, ultra-high molecular weight (UHMW) polyethylene is an ideal material, because it is both slick and long wearing, like tungsten carbide, while being much less expensive. Prior attempts at using UHMW polyethylene in paint control valves have not been truly successful, because of wear and extrusion problems. These problems have been primarily the result of valve designs that did not adequately support the seat, as UHMW polyethylene is not a structural material. The present invention solves these problems through a unique combination of design features which minimize the extrusion pressure on the seat and which transmit loads to surrounding structural components.

SUMMARY OF THE INVENTION

In the present invention a spring-biased fluid check valve is connected at one end to a source of fluid to be pumped, such as paint, and on the other to a pumping chamber. Suction created in the pumping chamber causes the valve to open and permits the flow of fluid from the source into the pumping chamber. The paint is pumped through a hose into a spray gun activated by a paint control valve having a plastic seat with means for radially and axially supporting the seat while under pressure.

The check valve includes a valve cartridge in which a valve stem and poppet are slideably mounted in the bore of a plastic bearing which has radiating fins engaging the inlet bore of the valve cartridge. The poppet seats on a plastic valve seat which fits into the inlet or high-pressure end of the valve cartridge. The valve seat covers the entire high-pressure end surface of the cartridge, eliminating the need for a separate washer. The high-pressure end cartridge surface is formed with a circular ridge around its outside edge to partially engage the valve seat, thereby minimizing the area of the seat susceptible to extreme deformation and improving its sealing ability.

The central portion of the valve seat which receives the poppet is recessed and extends downward into a corresponding recess in the valve cartridge. The walls of the seat which contact and receive the poppet are tapered inward and down to match the corresponding top to bottom inward taper of the poppet. Thus, when the poppet is forced into the seat under high pressure, the axial and radial forces are effectively transmitted to both the valve cartridge and poppet.

The paint control valve is provided with a brass ring cartridge insert to provide radial support for the seat and a steel back-up washer to provide axial support.

An object of the present invention, then, is to provide a fluid control valve which is inexpensive and long wearing even in the presence of abrasive liquids under high pressure.

A further object of the present invention is to provide a plastic valve seat which is subject to a minimum of wear and deformation from axial and radial forces.

A further object of the present invention is to provide a valve which does not require the use of close tolerance, press-fit valve seats.

Another object of the present invention is to provide a valve seat which affords an effective and long lasting seal against fluid leaks.

DESCRIPTION OF THE PREFERRED EMBODIMENTS

Figure 1:
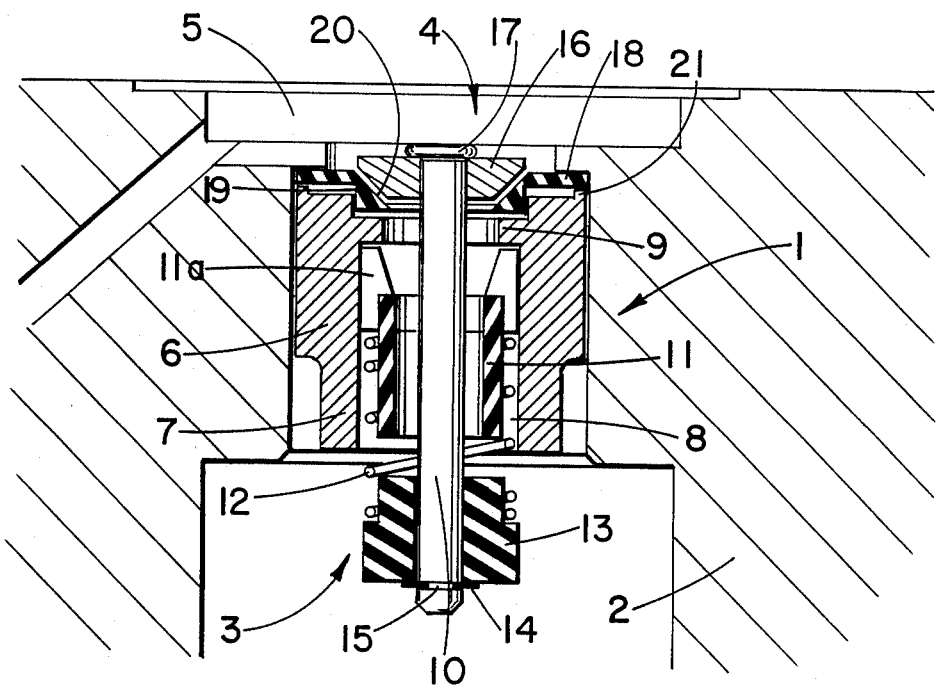
FIG. 1 is a cross-sectional side view of the check valve as installed in the pump block.
Figure 2:
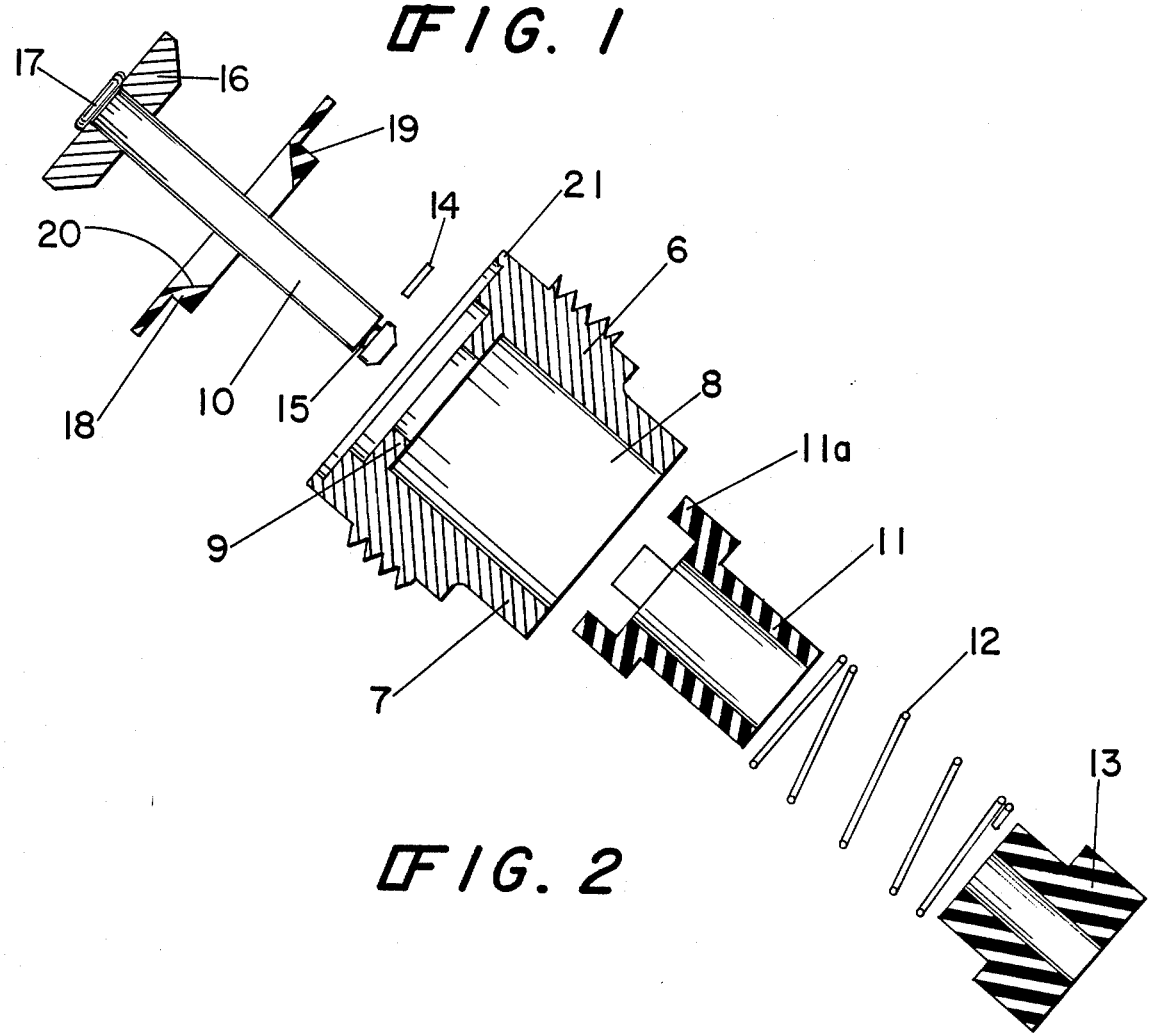
FIG. 2 is a partially exploded cross-sectional side view of the check valve.
Figure 3:
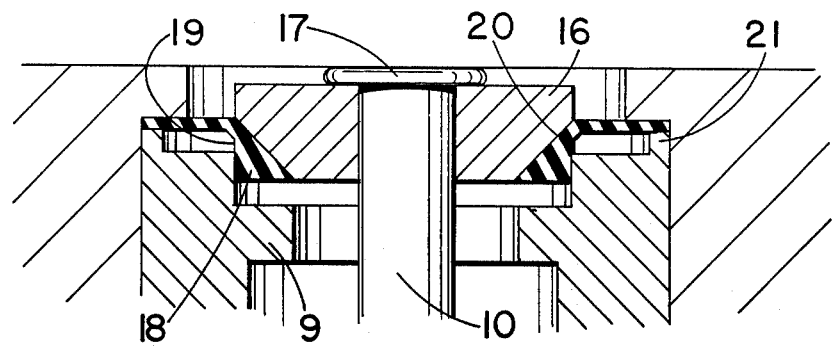
FIG. 3 is an enlarged cross-sectional side view of the valve seat and poppet area of the check valve.
Figure 4:
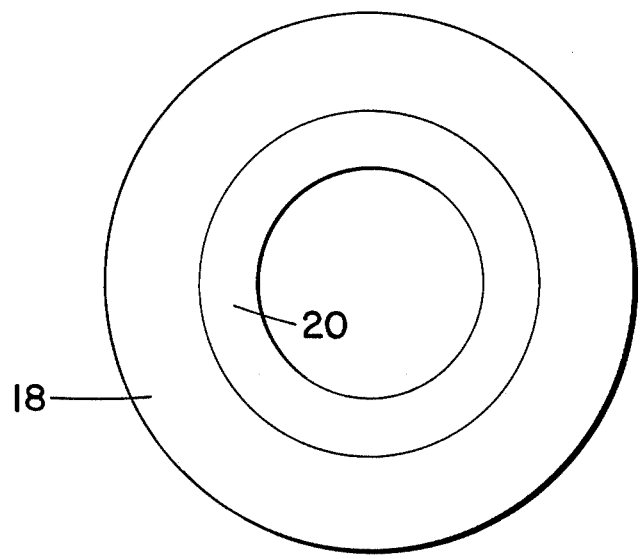
FIG. 4 is an enlarged top view of the plastic valve seat.
Figure 5:
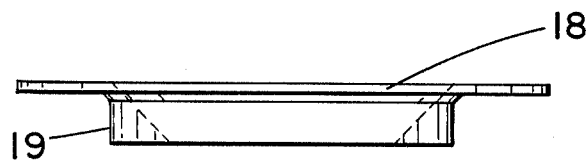
FIG. 5 is an enlarged side view of the plastic valve seat.

As best seen in FIG. 1, an assembled check valve 1 is located within block 2 of a pump of an airless spray paint system. As typically used, low pressure-end 3 of valve 1 is connected to a paint source, and high pressure port 4 discharges into pumping chamber 5.

Circular valve cartridge 6, preferably made of brass, steel or other similar material, is provided with external threads for securing valve 1 inside block 2. The lower section 7 of the cartridge 6 is machined to accept a standard socket-type wrench so that the valve can be quickly installed or removed from its low pressure-end.

Extending longitudinally through the center of cartridge 6 is circular bore 8. Said bore 8 is of uniform diameter except where it narrows at seat support ledge 9 and then widens slightly above said ledge. Centrally and slidably mounted within bore 8 is valve stem 10. A plastic bearing 11 surrounds a portion of valve stem 10 inside bore 8 and has radiating fins 11a which contact the interior surface of cartridge 6 and the lower surface of ledge 9.

A coil spring 12 surrounds bearing 11 and contacts the lower edges of fins 11a. The lower portion of spring 12 surrounds plastic spring support 13 which is press fit on the lower end of valve stem 10. Spring support 13 is secured to valve stem 10 by split washer 14 that press fits into slot 15 on valve stem 10.

Circular valve poppet 16, preferably made of steel, ceramic, or other structural material, is cemented on valve stem 10 against integral stem lip 17. Poppet 16 is tapered inward and down such that its maximum and minimum diameters are identical to the maximum and minimum diameters of bore 8 respectively.

Valve seat 18, preferably made of ultra-high molecular weight polyethylene, is generally circular in shape with a valve poppet seat section 19 which loosely engages the top surface of seat support ledge 9 and interior walls of the upper portion of bore 8. The inner walls 20 of cylindrical section 19, rather than being vertically oriented like the exterior walls, are tapered inward and down to match and receive the taper of valve poppet 16.

Valve seat 18 covers the entire horizontal surface of the high-pressure end of valve cartridge 6, initially and primarily contacting circular ridge 21 which is integral to the top surface of cartridge 6. This eliminates the need for a press-fit valve seat with corresponding close tolerances and the need for a separate sealing washer. When check valve 1 is assembled, little resistance is felt against the wrench while the cartridge is initially being torqued down. When the lower surface of valve seat 18 engages ridge 21, a sudden increase in required torque is perceived, and the assembler then knows that the proper depth of cartridge 6 within block 2 has been achieved. Circular ridge 21 is preferably approximately one-half the thickness of valve seat 18 so that ridge 21 can penetrate but not pierce seat 18. This provides an excellent seal against leaks under high pressure. It also focuses the forces exerted by poppet 16 while under pressure along the outside edge of seat 18, thereby minimizing the possibility of extrusion of seat 18 overall.

Spring 12 biases valve 1 in the normally closed position, forcing valve stem 10 and poppet 16 into and against seat 18. Under pressure, cartridge 6, particularly ledge 9, block 2, and poppet 16 provide both radial and axial support for seat 18, reducing wear and effectively transmitting extrusion forces to poppet 16, cartridge 6, and block 2.

Figure 6:
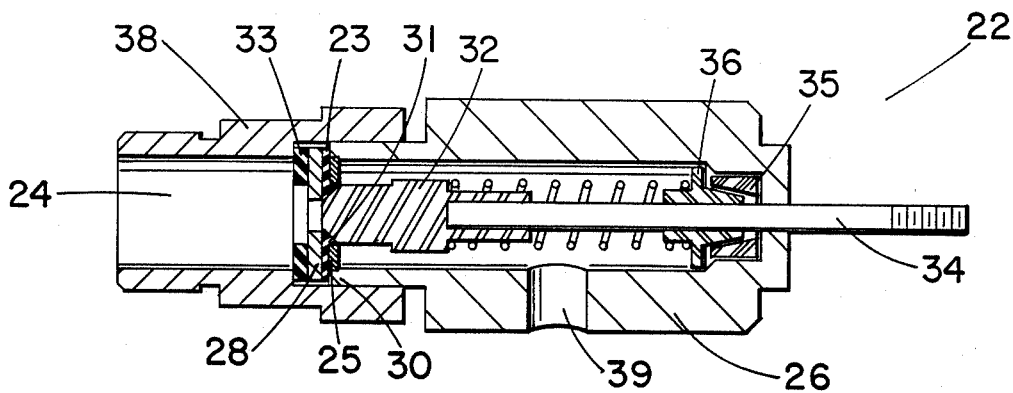
FIG. 6 is a cross-sectional side view of the paint control valve as installed in the spray gun.
Figure 7:
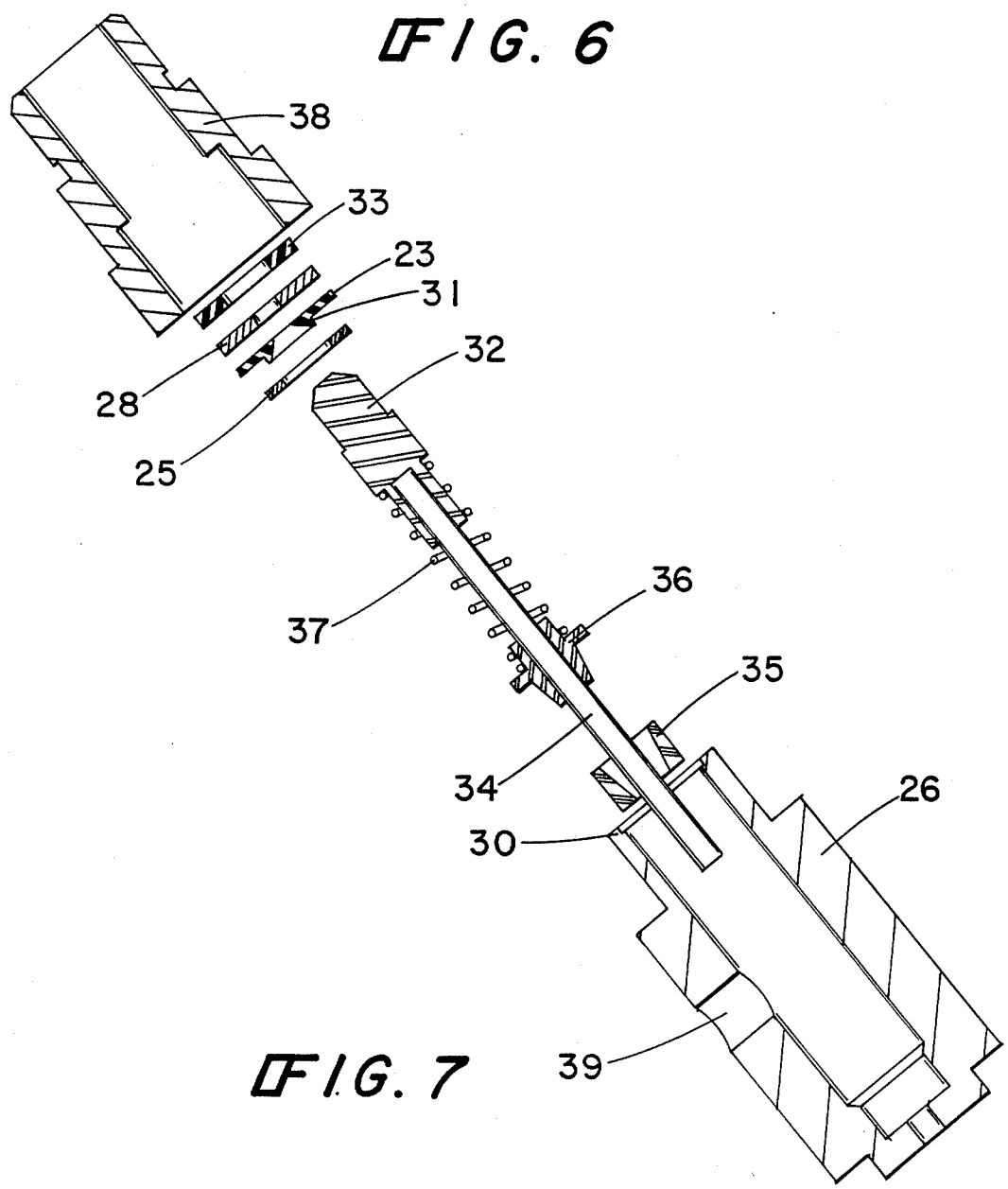
FIG. 7 is a partially exploded view of the paint control valve.

As shown on FIGS. 6 and 7, paint control valve 22 employs slightly different means for providing the unique radial and axial support for valve seat 23. Fluid filter-diffuser 38, which receives and supports the low-pressure side of seat 23, has a bore 24 which is larger in diameter than preferred for seat 23. Back-up washer 28, made of a structural material such as steel, effectively reduces that diameter and provides axial support for seat 23. Sealing washer 33, made of a resilient material, forms a seal between filter-diffuser 38 and back-up washer 28.

Seat 23 is mounted between valve cartridge 26 and back-up washer 28. Circular ridge 30 is formed around the outside edge of cartridge 26 to sealingly engage seat 23. Seat support ring 25, made of brass or similar material, is placed inside the high-pressure end of cartridge 26 to radially receive and support cylindrical section 31 of seat 23.

The interior walls of seat 23 are tapered to receive and match the taper of poppet 32. Valve needle stem 34 extends centrally through the bore of cartridge 26 and into poppet 32. Retainer 36 surrounds stem 34 and transmits the forces of spring 37 to seal 35. Seal 35 is made of a resilient material which expands to prevent fluid leakage past stem 34 and out of cartridge 26.

When the spray gun operator wishes to commence paint flow, needle stem 34 is actuated, moving poppet 32 away from seat 23. Paint under high pressure can then enter port 39 and flow into fluid filter-diffuser 38.

What I claim is:

1. A valve cartridge adapted for use with plastic valve seats in high pressure fluid systems comprising:
   a. a generally cylindrically shaped valve cartridge body;
   b. a generally centrally located bore through said cartridge body;
   c. a ridge integral to said cartridge body located around the outer periphery of the high-pressure end surface of said cartridge body for sealingly engaging and supporting a unitary valve seat of plastic material at its outer periphery and concentrating contact pressure along said ridge to reduce extrusion of said valve seat;
   d. ledge means integral to said cartridge body for positioning and supporting said valve seat both radially and axially; and
   e. where an upstanding wall from said ledge engages a corresponding downward extending wall from said valve seat, and the outer periphery of said valve seat defines a void for allowing for deformation of said valve seat during assembly of said valve seat and said cartridge to prevent leakage therebetween.

2. A fluid control valve adapted for use with resilient sealing components in high pressure abrasive environments comprising:
   a. a valve cartridge having a generally cylindrically shaped valve cartridge body; a generally centrally located bore through said cartridge body; a ridge integral to said cartridge body located around the outer periphery of the high-pressure end of the surface of said cartridge body for sealingly engaging and supporting a unitary valve seat of plastic material and concentrating contact pressure along said ridge to reduce extrusion of said valve seat; and ledge means integral to said cartridge body for positioning and supporting said valve seat both radially and axially;
   b. said valve seat being adapted for use with abrasive fluids under high pressure having an outer circular disc flange which sealingly covers substantially all of the high-pressure end surface of the cartridge valve; an inner valve poppet seat section defined by interior and outer walls, where said interior walls are tapered to matingly receive substantially all of the tapered walls of the tapered valve poppet such that when said poppet and said seat are engaged under pressure, said popped provides axial and radial support to said seat, and said outer walls being perpendicular to said disc flange for generally vertically and horizontally positioning and engaging the corresponding walls of said valve seat ledge, said ridge, said corresponding walls, said outer walls, and said disc flange defining a void allowing for deformation of said valve seat during assembly of said valve seat and said cartridge to prevent leakage therebetween;

c. a valve stem centrally aligned within the bore of said valve cartridge;

d. a valve poppet with tapered exterior walls to matingly engage the tapered recess of said valve seat;

e. a means for locating and securing said valve stem within the bore of said valve cartridge.

3. A fluid control valve adapted for use with resilient sealing components in high pressure abrasive environments comprising:

a. a valve cartridge having a generally cylindrically shaped valve cartridge body; a generally centrally located bore through said cartridge body; a ridge integral to said cartridge body located aroud the outer periphery of the high-pressure end of the surface of said cartridge body for sealingly engaging and supporting a unitary valve seat of plastic material and concentrating contact pressure along said ridge to reduce extrusion of said valve seat; and ledge means integral to said cartridge body for positioning and supporting said valve seat both radially and axially;

b. said valve seat being adapted for use with abrasive fluids under high pressure having an outer circular disc flange which sealingly covers substantially all of the high-pressure end surface of the cartridge valve; an inner valve poppet seat section defined by interior and outer walls, where said interior walls are tapered to matingly receive substantially all of the tapered walls of the tapered valve poppet such that when said poppet and said seat are engaged under pressure, said popped provides axial and radial support to said seat, and said outer walls being perpendicular to said disc flange for generally vertically and horizontally positioning and engaging the corresponding walls of said valve seat ledge, said ridge, said corresponding walls, said outer walls, and said disc flange defining a void allowing for deformation of said valve seat during assembly of said valve seat and said cartridge to prevent leakage therebetween;

c. a valve stem centrally aligned within the bore of said valve cartridge;

d. a valve poppet with tapered exterior walls to matingly engage the tapered recess of said valve seat;

e. a means for locating and securing said valve stem within the bore of said valve cartridge;

f. a ring radial support means surrounding said cylindrical section of said valve seat; and g. washer means immediately adjacent to said valve seat to provide additional axial support to said seat.

* * * * *